United States Patent
Schack et al.

[15] 3,649,222
[45] Mar. 14, 1972

[54] PREPARATION OF SULFUR CHLORIDE PENTAFLUORIDE

[72] Inventors: Carl J. Schack, Chatsworth; Richard D. Wilson, Canoga, both of Calif.

[73] Assignee: North American Rockwell Corporation

[22] Filed: Dec. 23, 1968

[21] Appl. No.: 785,999

[52] U.S. Cl.................................................23/367
[51] Int. Cl.....................................C01b 17/45, C01b 7/00
[58] Field of Search......................................23/367

[56] References Cited

UNITED STATES PATENTS

| | | | |
|---|---|---|---|
| 3,035,890 | 5/1962 | Roberts | 23/367 |
| 3,035,893 | 5/1962 | Roberts | 23/367 |
| 3,359,081 | 12/1967 | Tullock et al. | 23/367 |

*Primary Examiner*—M. Weissman
*Attorney*—Thomas S. MacDonald and L. Lee Humphries

[57] ABSTRACT

A novel and an improved method for preparing sulfur chloride pentafluoride from chlorine monofluoride and sulfur tetrafluoride by carrying out the reaction in the presence of cesium fluoride at ambient temperatures.

2 Claims, 2 Drawing Figures

PATENTED MAR 14 1972  3,649,222

INVENTORS.
CARL J. SCHACK
RICHARD D. WILSON
BY
Paul L. Sabatine
ATTORNEY

PREPARATION OF SULFUR CHLORIDE PENTAFLUORIDE

BACKGROUND OF THE INVENTION

This invention relates to an improved and new method for preparing sulfur chloride pentafluoride which compound is prepared by reacting chlorine monofluoride and sulfur tetrafluoride in the presence of cesium fluoride. The reaction between the reactants is performed in the presence of the said cesium fluoride, at ambient temperatures, and the reaction yields nearly quantitative amounts of the desired sulfur chloride pentafluoride.

In the prior art various methods were reported for preparing sulfur chloride pentafluoride. For example, U.S. Pat. No. 3,359,081 reports the preparation of sulfur chloride pentafluoride by heating sulfur (IV) fluoride with chlorine and a fluoride of an alkali metal in an autoclave. The process requires autoclave pressure and elevated temperature to produce the desired pentafluoride. A process similar to the process reported in U.S. Pat. No. 3,359,081 was set forth in the Journal of the American Chemical Society, Vol. 86, page 357, 1964. In this journal article a process is described wherein chlorine, an alkali fluoride and sulfur fluoride were heated to 150° C. to 250° C. in a steel pressure vessel to give sulfur chloride pentafluoride. Two other processes for preparing sulfur chloride pentafluoride are reported in the prior art, one in German Pat. No. 1,105,857 and the other in British Pat. No. 883,673, respectively. The process as set forth in said German patent prepares sulfur chloride pentafluoride at elevated temperatures above 100° C. and in a nonalkali fluoride system. The British patent set forth immediately above prepares sulfur chloride pentafluoride by treating chlorine trifluoride with elementary sulfur to produce intermediary products and then the final product.

In the light of the prior art method, it becomes immediately obvious to one skilled in the art that a need exists for a simple, reliable and reproducible method for preparing sulfur chloride pentafluoride.

Accordingly, it is an object of this invention to provide a novel method for synthesizing sulfur chloride pentafluoride. It is a further object of this invention to provide a method for preparing sulfur chloride pentafluoride that does not require expensive laboratory equipment, complicated reactions and elevated temperatures. It is still a further object of this invention to make available to the art an unobvious and novel method for synthesizing sulfur chloride pentafluoride by reacting chlorine monofluoride and sulfur tetrafluoride in the presence of cesium fluoride at ambient temperatures and isolating the desired product therefrom. It is yet a further object of this invention to overcome the difficulties associated with the prior art. Other objects and advantages of the invention become apparent from the following detailed description and accompanying claims.

SUMMARY OF THE INVENTION

Novel synthesis of sulfur chloride pentafluoride by intimately contacting and reacting chlorine monofluoride and sulfur tetrafluoride in the presence of cesium fluoride at ambient temperatures. The desired product, sulfur chloride pentafluoride, is conveniently isolated from the reaction medium by fractional condensation.

DESCRIPTION OF PREFERRED EMBODIMENT

Figure 1:
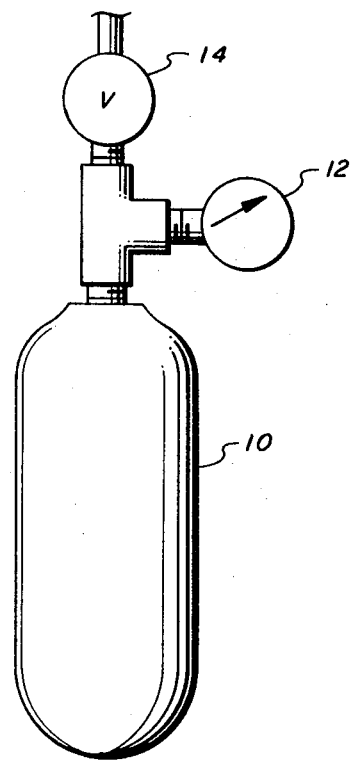

The novel method of this invention for synthesizing sulfur chloride pentafluoride by intimately contacting and reacting chlorine monofluoride and sulfur tetrafluoride in the presence of cesium fluoride can be successfully performed at ambient temperatures, that is, at about 20° to 30° C. with the reaction usually performed at about 25° C. Generally, the reactants chlorine monofluoride and sulfur tetrafluoride are employed in the reaction on a 1 to 1 mole ratio; however, excess of either may be present and the reaction can be successfully performed to give sulfur chloride pentafluoride. The amount of cesium fluoride employed can vary over a wide range, for example, for about 0.1 to about 10 mole of cesium fluoride for the total amount of chlorine monofluoride and sulfur tetrafluoride employed for the synthesis of sulfur chloride pentafluoride. One of the unobvious features of the reaction of this invention is that the reaction does not consume any of the cesium fluoride to give cesium chloride and because of this the cesium fluoride may be used indefinitely in the reaction. Another feature that distinguishes the present reaction from other reactions is that in the absence of cesium fluoride a reaction between chlorine monofluoride and sulfur tetrafluoride does not occur at ambient temperatures while in the present reaction low temperatures are successfully used for the reaction. Another novel feature of the synthesis of this invention resides in the ability to easily separate sulfur chloride pentafluoride from the other reaction products. For example, when the reactant gaseous chlorine is reacted with sulfur (IV) fluoride, and an alkali metal fluoride at elevated temperatures (see U.S. Pat. No. 3,359,081 as mentioned above), there is an incomplete conversion of the starting reagents leaving a mixture that contains unreacted chlorine. This latter unreacted chlorine gas is difficult to separate from the gaseous sulfur chloride pentafluoride because of the closeness of their boiling points. In contrast to the prior art reactions employing chlorine, the present invention has not employed any gaseous chlorine or elevated temperature. Thus, the final products of the present invention are conveniently separated from the reaction media by fractional condensation of the products from liquid nitrogen temperature to ambient temperature.

The above discussion is merely illustrative of the mode and manner of carrying out the invention, and it is to be understood that the discussion is not intended to be limited thereto. The following examples are representative of embodiments of the present invention.

EXAMPLE I

A 300ml. Monel cylinder was loaded with cesium fluoride (5 g., 32.9 mmole) and evacuated to $10^{-3}$ mm. mercury. The cylinder was cooled to $-196°$ C. with a liquid nitrogen bath and sulfur tetrafluoride (209 cc., 9.33 mmole) and chlorine monofluoride (216 cc., 9.65 mmole) were successively condensed into the cooled cylinder. The cylinder valve was closed and the cooling bath removed from the cylinder. Next, the cylinder was allowed to warmup to room temperature, about 25° C., and let stand at that temperature for 1 hour. The cylinder was then recooled to $-196°$ C. and no noncondensable volatile materials were noted at this temperature. Next, the $-196°$ C. bath was removed and the material in the cylinder was separated by fractional condensation, and the fraction at $-126°$ C. was isolated to give the desired product. Sulfur chloride pentafluoride was obtained (200 cc., 8.92 mmole) in yield greater than 95 percent. The volatile products remaining in the $-196°$ C. fraction were $SOF_2$, $SO_2F_2$ and $ClF$.

EXAMPLE II

The same 300 ml. Monel cylinder and 5 g. of cesium fluoride (32.9 mmole) as in Example I was used with sulfur (IV) fluoride (1848 cc., 82.5 mmole) and chlorine monofluoride (1,835 cc., 82,0 mmole) in the procedure described in Example I. Product sulfur chloride pentafluoride was obtained (1,700 cc., 75.6 mmole) in 92 percent yield. The remaining products were $SOF_2$, $SO_2F_2$, $SF_6$ and unreacted $SF_4$.

In the accompanying drawing is set forth a schematic view of the reaction cylinder and the fractional condensation train employed within the spirit and scope of this invention. Turning now to accompanying FIG. 1, there is depicted a cylinder 10 provided with a pressure gauge 12 and a valve 14. The cylinder is made of Monel metal and the cylinder has a capacity of 300 ml. The pressure gauge 12 has a range of from 0 to 1,000 p.s.i. (pounds per square inch). In actual practice, the reaction is conveniently performed above or below normal atmospheric pressure. Accompanying FIG. 2 depicts a fractional condensation system utilized for isolating the reaction products produced by the reaction of the invention. In FIG. 2, cylinder 10, with pressure gauge 12 and valve 14, is connected to a series of U-traps, 16, 20 and 22. The traps are connected to each other through separate valve assemblies 14 and each U-trap is attached to pressure gauge 18 which has a range of from 0 to 1,000 mm. of Hg absolute. The U-traps are made of Teflon. Teflon is the registered trademark of E. I. du Pont de Nemours, Inc. Teflon is polytetrafluoroethylene.

Figure 2:
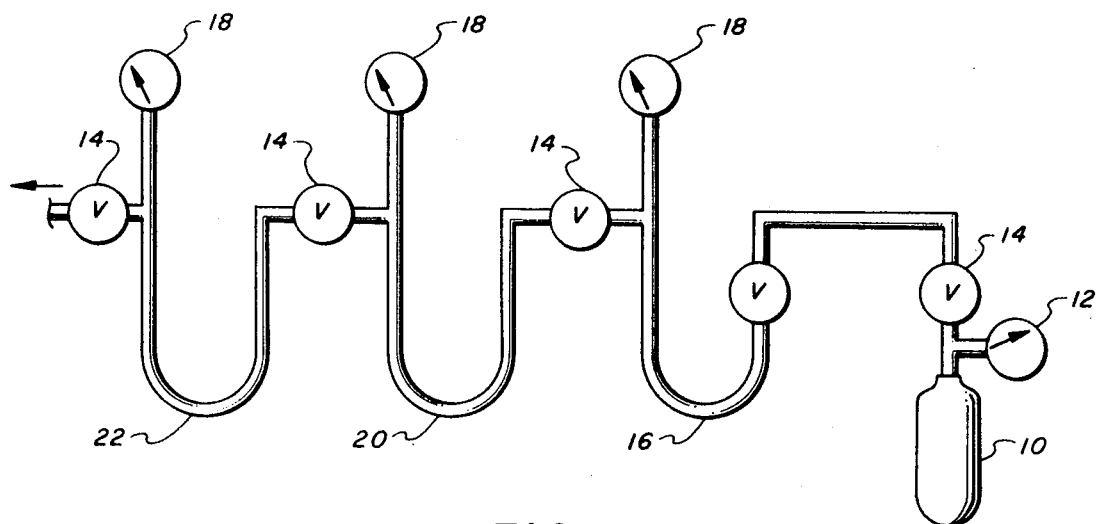

Turning now to accompanying drawing FIG. 1, in operation said gas cylinder 10 is loaded with some cesium fluoride and evacuated and cooled in a liquid nitrogen bath. Then, sulfur tetrafluoride and chlorine monofluoride are admitted into cylinder 10 through valve 14. The cylinder valve is closed and the cylinder is allowed to warm to room temperature and stand for about 1 hour. At this temperature reaction between sulfur tetrafluoride and chlorine monofluoride is completed to produce sulfur chloride pentafluoride. Next, the cylinder which is attached to the fractional condensation traps (as depicted in FIG. 2, U-traps 16, 20 and 22) is cooled to −196° C. The traps 16 and 20 may both or either be cooled at −126° C. and trap 22 is cooled at −196° C. The cylinder 10 is warmed to ambient temperature to allow the sulfur chloride pentafluoride from cylinder 10 to flow through the traps. At the −126° C. temperature the sulfur chloride pentafluoride is condensed into a solid and remains in the −126° C. trap or traps. All of the other gaseous products produced in the reaction such as $SO_2$, $SO_2F_2$ and unreacted ClE fractionally condense into trap 22 which is at −196° C. Traps 16 and 20 can be conveniently separated from the fractional condensation system by closing valves 14 from the system to give pure, isolated sulfur chloride pentafluoride. Sulfur chloride pentafluoride on warming to room temperature is a colorless gas and it is highly toxic. Sulfur chloride pentafluoride condenses to a colorless liquid at −19° C. and freezes to a white solid at −64° C. Its solidification properties are utilized for separating the compound in the traps cooled at −126° C.

The sulfur chloride pentafluoride compound of the invention is a well known compound and it possesses utility known to the prior art. For example, sulfur chloride pentafluoride, as set forth in Chemical Abstracts, Vol. 69, page 41,722, can be used for the polymerization of $C_2F_4$. Another utility set forth for the compound is for the preparation of pentafluorosulfur substituted azomethines; see Chemical Abstracts, Vol. 64, page 9,593. Additional utility for the compound such as preparation of polymers and telomers of tetrafluoroethylene and ethylene telomers can be found in Chemical Abstracts, Vol. 56, page 11,808; Chemical Abstracts, Vol. 57, page 15,360; and Chemical Abstracts, Vol. 58, page 6,945.

It is to be understood that the above described embodiments are merely illustrations of the broad principles of this invention. Those skilled in the art with this application before them may readily devise other variations that will embody the principles of this invention. It is, therefore, to be understood that within the scope of the appended claims, the invention may be practiced otherwise than as specifically described.

We claim:

1. A process for preparing sulfur chloride pentafluoride comprising reacting chlorine monofluoride and sulfur tetrafluoride in the presence of cesium fluoride at about 20° to 30° C. and at about normal atmospheric pressure and recovering sulfur chloride pentafluoride from the reaction mixture.

2. The process of claim 1 in which chlorine monofluoride and sulfur tetrafluoride are employed in the reaction in a 1 to 1 mole ratio.

* * * * *